April 10, 1928.
E. C. DWYER ET AL
1,665,950
ELECTRICAL HEATING ATTACHMENT
Filed Aug. 30, 1927
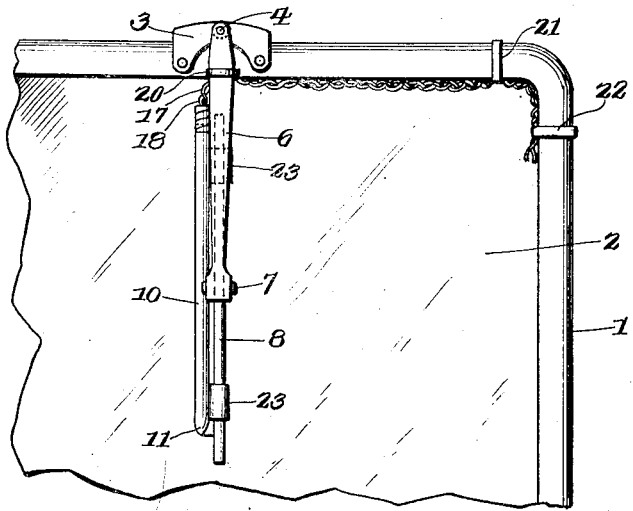
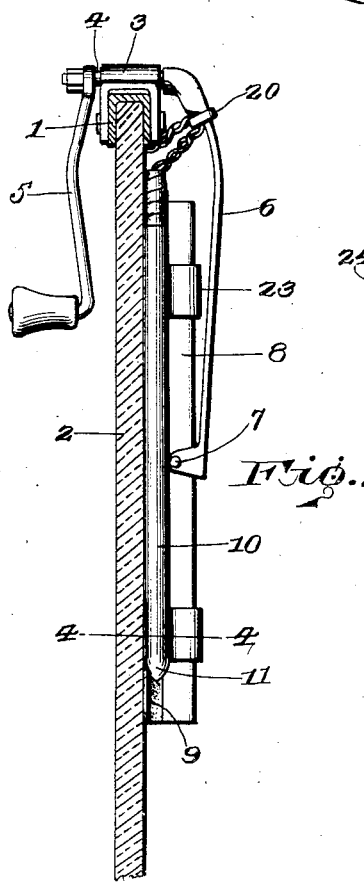
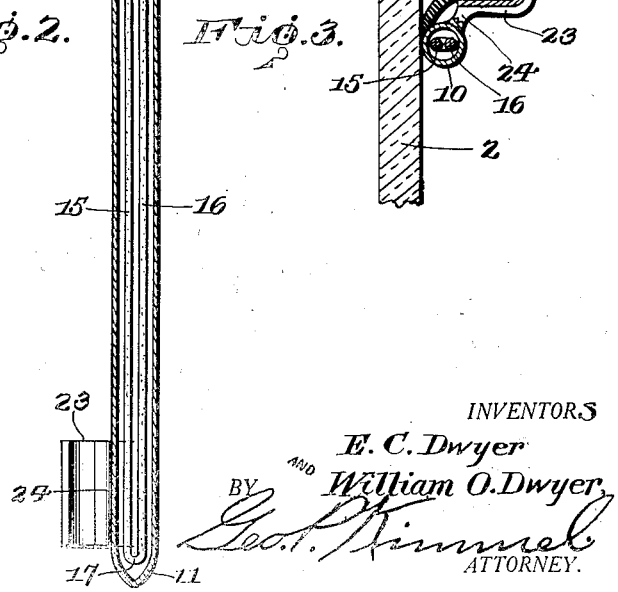
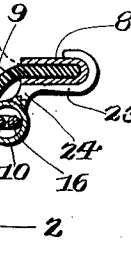
INVENTORS
E. C. Dwyer
AND William O. Dwyer
BY Geo. F. Kimmel
ATTORNEY.

Patented Apr. 10, 1928.

1,665,950

UNITED STATES PATENT OFFICE.

EDWARD C. DWYER, OF CLYMER, AND WILLIAM O. DWYER, OF BERLIN, PENNSYLVANIA.

ELECTRICAL HEATING ATTACHMENT.

Application filed August 30, 1927. Serial No. 216,424.

This invention relates to an electrical heating attachment designed primarily for use in connection with windshield cleaners, but it is to be understood that a heating attachment, in accordance with this invention, may be employed for any purposes for which it is found applicable, and the invention has for its object to provide, in a manner as hereinafter set forth, an electrical heating attachment for connection to the oscillatory carrier of the wiper member of a windshield cleaner, for the purpose of heating said member and the windshield glass to the end that the formation of ice or vapor thereon is prevented, or if the same is already formed it is dissipated therefrom.

A further object of the invention is to provide, in a manner as hereinafter set forth, a heating attachment for windshield cleaners constructed and arranged to afford sufficient heat or warmth to dissipate or prevent the formation of ice on the windshield glass, within the arcuate area defined by the limits or extremities of movement of the wiper member of a windshield cleaner, and even beyond such area, without heating the glass to an extent that would cause injury to the same.

Further objects of the invention are to provide an electrical heating attachment, in a manner as hereinafter set forth, a windshield cleaner which is simple in its construction and arrangement, strong, durable, compact, thoroughly efficient in its use, readily installed with respect to a wiper member and its carrier of a windshield cleaner, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view, in front elevation, of a windshield and further illustrating a cleaner device associated therewith and further showing the adaptation of an electrical heating attachment, in accordance with this invention, for the windshield glass and wiper member of the cleaner device.

Figure 2 is a vertical sectional view of a windshield showing the adaptation therewith of a cleaner device therefor and an electrical heating attachment, in accordance with this invention, for the cleaning device and windshield glass.

Figure 3 is a vertical sectional view of an electrical heating attachment in accordance with this invention.

Figure 4 is a fragmentary view in longitudinal section of a windshield showing the adaptation therewith of a cleaner device therefor and a heating attachment, in accordance with this invention for the cleaner device and with said device and attachment shown in sectional plan.

Referring to the drawings in detail 1 denotes a windshield frame and 2 the transparent panel or glass of the windshield. Supported on the top edge of the glass panel 2, as well as being suitably secured with the latter, is a bearing member 3, through which extends the rotatable shaft 4, carrying on its inner end a crank handle 5 for oscillating the shaft 4. The outer end of the shaft 4 has fixed thereto, the inturned upper end of a hanger arm 6, and the latter has its lower end pivotally connected as at 7, to a carrier 8 for a flexible wiper member 9, the latter being secured within the carrier 8 and projected a substantial distance therefrom, and in a manner whereby the projecting portion of the wiper member can engage the outer face of the glass panel 2 and clean the same during the oscillation of the shaft 4. The foregoing elements are of known construction and are illustrated by way of example so as to show the adaptation of an electrical heating attachment, in accordance with this invention, with respect to the carrier 8, wiper member 9 and outer face of the glass panel 2.

The attachment includes a tubular casing 10 of substantial diameter and which is closed at its lower end, as indicated at 11 and is formed with an open upper end 12. Preferably the casing 10 is of less length than the length of the carrier 8 and it is positioned in parallelism with one side of the carrier 8 and one side of the wiper member 9. Arranged within the casing 10 is a removable electrical heating unit 13, which at its upper end extends through and has connected therewith a plug 14 of insulation material. The unit 13 comprises a pair of heating members 15, 16 of greater length than the length of the casing 10 and said members 15, 16 are connected together at their lower ends as at 17, or in other words the lower end of the member 15 merges into the lower end of the member 16. The upper end of the member 15 merges into a circuit connection 17 and the upper end of the member 16 merges into a circuit connection 18. The unit 15 is arranged in spaced relation with respect to the inner face of the casing 10. A resilient coupling sleeve 19 of insulation material surrounds and engages the circuit connections 17, 18 and also surrounds and engages the upper end of the casing 10. The sleeve 19 provides a frictional clamp between the circuit connections or leading-in wires 17, 18 and the casing 10. A connecting ring 20 is carried by the arm 6 and provides means for coupling the circuit connections or leading-in wires 17, 18 to said arm 6. Clamping means, as indicated at 21, 22 are carried by the frame 1 for clamping the circuit connections or leading-in wires 17, 18 to said frame 1. The circuit connections or leading-in wires 17, 18 extend from a suitable electrical source, not shown, and which source may be if desired, the battery of a motor vehicle, although a separate battery can be employed if desired.

The casing 10 is fixedly secured to the carrier 8 and bodily moves therewith and further said casing 10 is offset with respect to the carrier 10, but engages the wiper member 9 and also engages the outer face of the glass panel 2. Hook-shaped securing devices 23 are fixedly secured to and overlap the outer side of the carrier 8. The securing devices are arranged in spaced relation and in proximity to the ends of the carrier 8 and each securing device is formed with an outwardly directed arm 24 which is secured to or formed integral with the casing 10. The position of the heating attachment, that is the casing 10, with respect to the carrier 8 and wiper member 9, as well as the outer face of the glass panel 2, is shown in Figure 4. The heating attachment not only provides means for heating the outer face of the glass panel 2, but also for heating the projecting portion of the wiper member 9. The attachment oscillates with the carrier 8 and wiper member 9 and functions to heat the wiper member 9 and outer face of the glass 2, or rather the glass panel 2, to the end that the formation of ice or vapor thereon is prevented, or the same if already formed on the glass panel is dissipated therefrom.

It is thought the many advantages of an electrical heating attachment, in accordance with this invention, and for the purpose set forth, can be readily understood, particularly as it efficiently functions in the manner as referred to, and further whereby the heating unit 13 can be conveniently removed from the casing 10, when desired, and although the preferred embodiment of the invention is as illustrated and described, yet it is to be understood that changes in the details of construction can be had which will fall within the scope of the invention as claimed.

What we claim is:

1. In an electrical heating attachment for windshield cleaners of that type including an oscillatory carrier provided with a wiper member extended therefrom for the outer face of the windshield glass, the combination of a casing opened at its top and closed at its bottom and abutting said member and to contact with said glass, coupling means extended from the carrier whereby the former will be bodily carried with the latter during the oscillation of the carrier, an electrical heating unit extending into said casing through the upper end thereof and providing means for heating the casing, said member and glass, and resilient means for detachably clamping said unit to said casing, said means surrounding the upper end of the casing and a portion of said unit exteriorly of and in proximity to the open end of the casing.

2. In an electrical heating attachment for windshield cleaners of that type including an oscillatory carrier provided with a resilient wiper member extended therefrom to oppose the outer face of a windshield glass, the combination of a casing abutting one side of said member and the glass, coupling means fixed to the casing, extended therefrom and connected to said carrier whereby the casing is maintained in spaced relation with respect to the carrier and connected to the latter to bodily move therewith, an electrical heating unit extending into said casing through one end thereof and providing means for heating the casing, said member and glass, and resilient means for detachably clamping said unit in said casing.

In testimony whereof, we affix our signatures hereto.

EDWARD C. DWYER.
WM. O. DWYER.